United States Patent [19]

Babb

[11] 4,259,020
[45] Mar. 31, 1981

[54] AUTOMATIC CALIBRATION CONTROL FOR COLOR GRADING APPARATUS

[75] Inventor: Raymond E. Babb, Fremont, Calif.

[73] Assignees: Genevieve I. Hanscom, a part interest; Genevieve Hanscom; Robert M. Magnuson; Lois J. Thomson, all of San Jose, Calif. ; Trustees of the Estate of Roy M. Magnuson, part interest to each

[21] Appl. No.: 955,980

[22] Filed: Oct. 30, 1978

[51] Int. Cl.³ .............................................. G01J 3/50
[52] U.S. Cl. .................................. 356/402; 356/407; 356/243
[58] Field of Search ....................... 209/580, 581, 582; 356/402, 407–414, 425, 243, 319, 323–325, 405, 406

[56] References Cited

U.S. PATENT DOCUMENTS

| 3,680,957 | 8/1972 | Fukuda | 356/325 |
| 3,998,555 | 12/1976 | Babb | 356/407 |
| 4,057,352 | 11/1977 | Babb | 356/407 |

Primary Examiner—F. L. Evans
Attorney, Agent, or Firm—Gerald L. Moore

[57] ABSTRACT

Apparatus for color grading of products such as fruits, vegetables, et cetera, employing a light source for illuminating the product and means for detecting and comparing the reflectance to measure certain product properties. For calibration, a target of known color is moved in front of the light source and the resulting signal is compared with a reference signal to generate a modifying signal. For automatic calibration of the apparatus this modifying signal is stored and thereafter used to adjust all subsequent readout signals.

8 Claims, 4 Drawing Figures

AUTOMATIC CALIBRATION CONTROL FOR COLOR GRADING APPARATUS

BACKGROUND OF THE INVENTION

Color grading apparatus is utilized to detect the color of products, especially food products, for separating those having a color outside selected limits. Such separation might be used to delete spoiled or blemished products as well as those overripe or underripe.

In addition, such color grading apparatus can be used to control processes wherein a color change results from the process. In the cooking of potato chips, for instance, the cooking temperature of the chips can be regulated by detecting the color of the chips as they leave the oven. The resulting color-responsive signal can be compared to a reference signal indicating the product color desired to control the process for cooking the product so that the desired color is obtained.

A major problem in such systems results from the tendency of the light-emitting device to vary light wave length emitted with usage, thereby rendering the color indication erroneous. Such change can result from deterioration of the light source which will change the intensity or the wavelength of the light directed onto the product. A more common problem results from the deposit of moisture, cooking oil or other film on the light-emitting head or lens which film tends to filter or reduce the intensity of the light. For instance in the monitoring of a cooking process, the product coming out of the oven is surrounded by heated cooking oil and moisture-laden air. Fumes naturally rise around the color grading apparatus and in a short time can result in the formation of deposits on the light-emitting head. Any such deposits serve to obstruct the passage of light from the head to the product and filter certain light wavelengths to make the subsequent color reading erroneous in indicating the true color of the product.

This invention relates to an improvement in color grading apparatus of the type described in U.S. Pat. No. 4,057,352, Color Grading Apparatus Utilizing Infrared Light Source, R. Babb, issued on Nov. 8, 1977, and U.S. Pat. No. 3,998,555, Color Grading Apparatus, R. Babb, issued on Dec. 21, 1976.

It is the purpose of the subject invention to provide a color grading apparatus which automatically calibrates so the readout signal indicating color is adjusted for differing light conditions.

SUMMARY OF THE INVENTION

Apparatus for monitoring the color of a product wherein a color detecting head focuses light on the product and reflected light in preselected wavelengths is measured for sensing the color of the product. For calibrating the apparatus, a target of known color is moved in front of the head and the intensity of the light reflected therefrom is measured. The light intensity signal is compared to a known standard signal for generating a modifying signal responsive to any difference between the signals to correct subsequent light readings.

DESCRIPTION OF THE INVENTION

Figure 1:
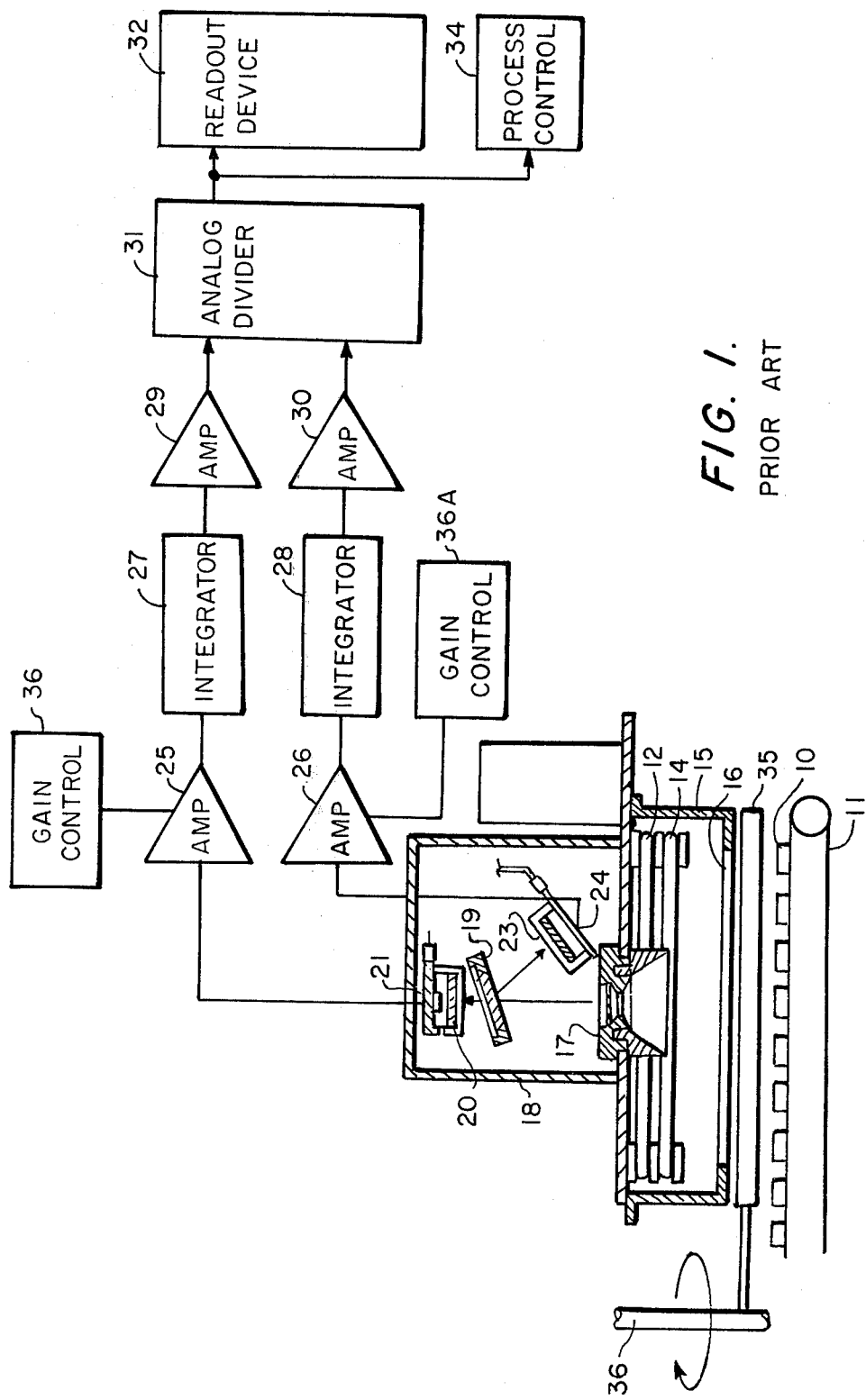
FIG. 1 shows a block diagram of a prior art device in which the subject invention can be used.

Apparatus suitable for incorporation of the subject invention is shown as prior art in FIG. 1 wherein the product 10 carried by a conveyor belt 11 is tested for color. In a typical system the conveyor carries the product, usually a food product, from an oven or other form of processing station. It is desired to control this process by testing the color of the product as it comes out and by readjusting the process so that the color of the product falls within a predetermined color range thereby indicating a satisfactory processing has been accomplished.

The product is tested by exposing it to light of a predetermined frequency range such as that emitted by the light sources 12 and 14 in a color detecting head. These light sources are in a housing 15 positioned directly over the path of the product being measured. In a preferred embodiment, the light sources are of a cylindrical configuration with a center opening through which reflected light from the product can pass back into a lens system 17 leading into an enclosed lightproof housing 18. The light strikes a dichroic mirror 19 which is used because in this embodiment two different light regions are sensed to detect the properties desired. The dichroic mirror passes one predetermined light region and reflects another. The light passing through the dichroic reflector strikes a filter 20 and a photodiode 21. The reflected light passes through a separate filter 22 and strikes a photodiode 24. In this manner the reflected light is detected in two separate light regions of predetermined frequencies. The filtering of the reflected light must be sufficiently efficient to make the light intensities a true indication of the reflected color of the product.

The signals resulting from the two light regions detected are subsequently compared for the generation of a ratio signal. By the generation of the ratio signal, variables are eliminated which otherwise might affect the reflected light intensities but which have little to do with the color or processing of the product. For instance if the product quantity on the support or conveyor belt varies, the color of the conveyor belt can show through the lesser quantity product and change the intensity of reflected light in various frequency ranges. In addition if the product is piled higher in some places than others, such that it passes closer to the light sources and the lens assembly 20, the intensity of the reflected light can change. The overall intensities of the light sources also may diminish. By use of the two color regions and the generation of the ratio signal, many of the effects of the beforementioned occurrences are diminished because it is assumed that these effects will change the light intensities of the two light regions in a substantially equal manner such that the calculation of the ratio signal will cancel out the effect.

The signals from the photodetectors 21 and 24 are fed through parallel electrical circuits each including amplifiers 25 and 26, integrators 27 and 28, and additional amplifiers 29 and 30, respectively. Each signal is processed in the respective circuit and fed to an analog divider 31 for the generation of the signal responsive to the ratio of the intensities of the reflectance in the two selected frequency ranges. The output from the analog divider is fed to a readout device 32 which in the normal case is a meter or recording strip chart. In addition the signal can be fed to a process control 34 for the purpose of regulating the process occurring immediately preceding the color measurement.

Such systems can be used in processes wherein the product is to be heated, for instance in the blanching of frenchfried potatoes or roasting peanuts wherein the color changes with the intensity of the heating. By measuring the reflectance in predetermined frequency ranges and generating a color ratio signal responsive thereto, the process can be regulated to produce a uniformly colored product. In addition, such color-sensing apparatus can be applied in potato peelers and the like to test the degree of peeling and control the peeling process so as to minimize waste while rendering an effective peeling operation. Of course there are many other uses for such controls regulated by color-sensing apparatus.

In the example shown in FIG. 1, the process control can be used either to control the heat of a furnace (not shown) or the speed by which the conveyor carries the product 10 for cooking. The control can either speed up or slow down the conveyor depending upon whether less or more cooking of the product is desired. The time the product speeds in the oven can be regulated by use of the process control 34. It is also possible to control the temperature of the oven while leaving the conveyor speed constant to control the degree of cooking. Such controls are well-known.

In addition it might be necessary only to detect one color range if that color is a true indication of the characteristic to be tested. While a single color would not allow cancellation of the effects of a change of intensity of the light source, still it is possible that such a light source compensation might not be necessary. For instance in the detecting of the temperatures to which metals are heated, it is possible to detect only the light radiated by the metal itself in which case it would not be necessary to detect two different color ranges nor to provide a separate light source.

Whether single or multiple light wavelength regions are detected, there exists the necessity to calibrate the instrument periodically because of the tendencies of the light sources to drift, the effect of the environment such as the depositing of films on the light-emitting sources of the light-transmitting members, and changes which can occur in the electronic circuitry due to temperature or long term usage. In order to calibrate the instrument previously, a target of known color such as a plate 35 mounted on a rotatable shaft 36 is swung into position beneath the aperture 16. By viewing the readout device 32, the ratio signal is read and gain controls 33 and 33A can be manually adjusted to change the gain of at least one of the parallel circuits so the reading is correct for that target. In this manner manual adjustment of the instrument has been possible.

Figure 2:
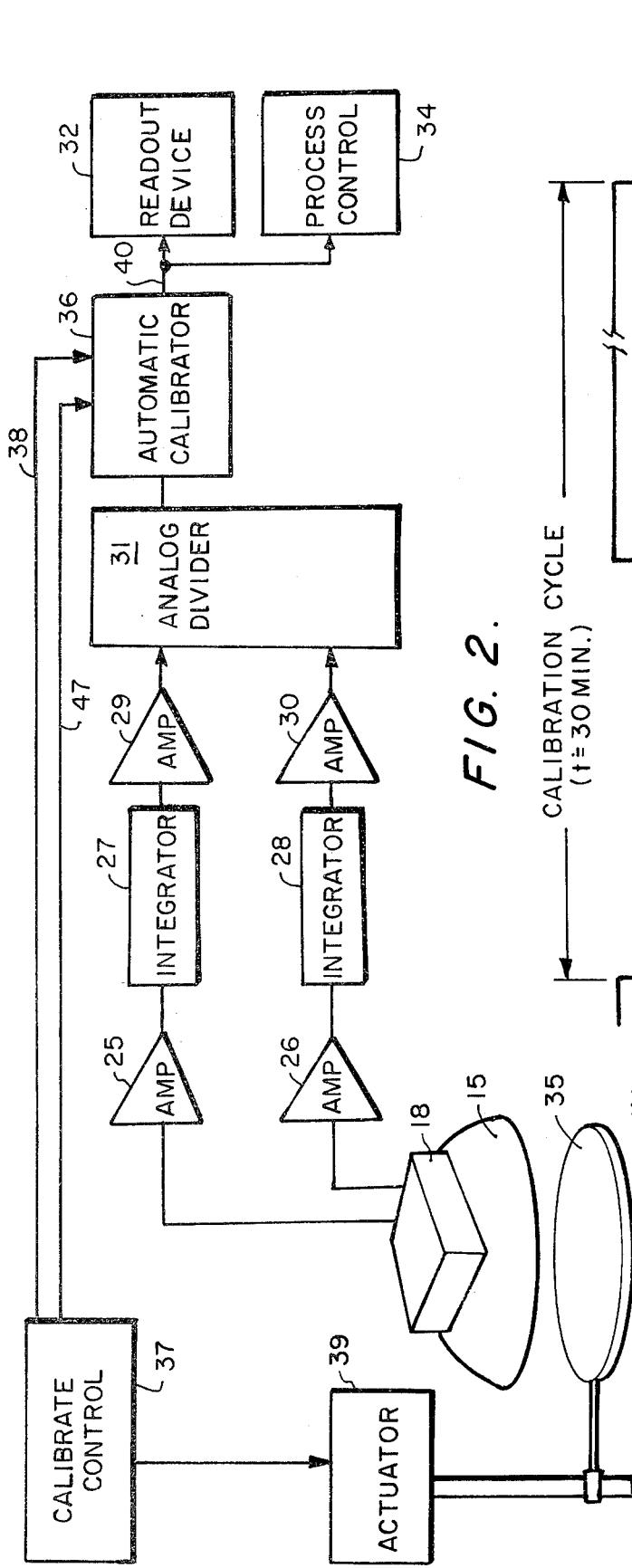
FIG. 2 is a block diagram of the apparatus circuit of FIG. 1 with the invention incorporated.

In accordance with the present invention, there is provided a circuit for automatically calibrating the color apparatus previously described. Accordingly as shown in FIG. 2 there is incorporated between the readout device 32 and the analog divider 31 an automatic calibrator 36 which serves to check the calibration of the instrument periodically to allow the generation of a modifying signal to correct inaccuracies in the readout signal of the apparatus. For this purpose the automatic calibrator acts under control of a control calibrator 37. This control energizes an actuator 39 for rotating the target 35 and initiates the calibration sequence. When the target 35 is moved beneath the housing 15, the readout signal is then compared to a predetermined signal and a modifying signal is generated responsive to any difference therebetween.

Figure 3:
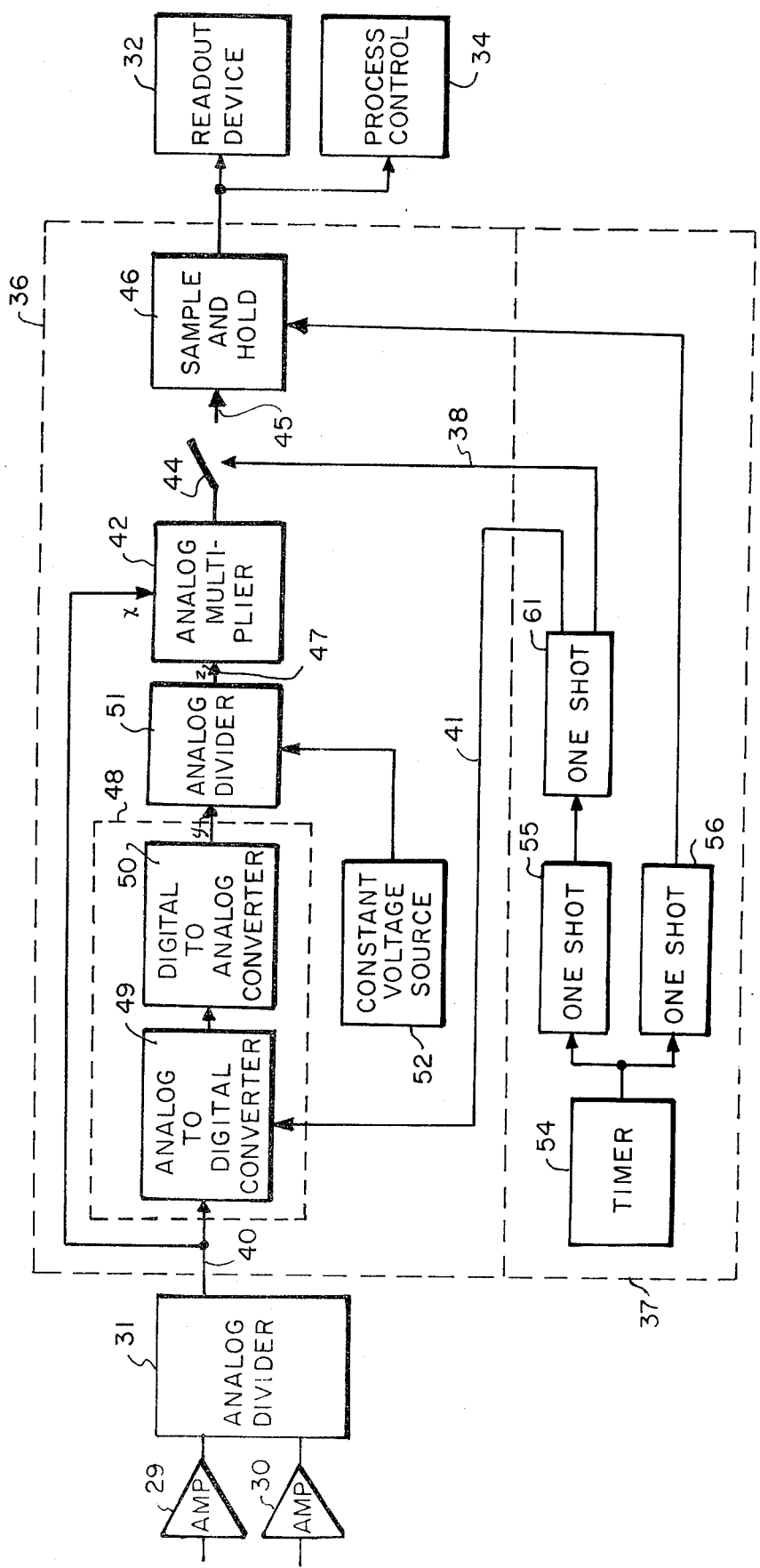
FIG. 3 is a block diagram of the automatic calibrator of the circuit shown in FIG. 2.

As shown in FIg. 3 the signals from the amplifiers 29 and 30 are fed to an analog divider 31 which in turn supplies the resulting ratio signal to the automatic calibrator 36. This color signal is transmitted through the conductor to an analog multiplier 42. In the normal operation of the apparatus, switch 44 is closed thereby allowing the signal to pass through the analog multiplier, the switch 44, the conductor 45, to a sample and hold 46 from which it is subsequently conducted to the readout device 32 and the process control 34. The analog multiplier 42 modifies the readout signal by a signal Z received through the conductor 47 to adjust the readout signal by an amount determined by the immediately previous calibration sequence. The operation of the calibration sequence will be explained hereinafter.

When calibration is desired, the calibration control 37 signals the actuator 39 to move the disc 35 beneath the light detecting head. At the same time a signal is transmitted through the conductor 38 to the automatic calibrator 36 to open the switch 44 and, through the conductor 47, to energize the sample and hold circuit 48. The switch 44 is opened so that during calibration, broad excursions of signal strength which might exceed the range of the readout device are not transmitted to the readout device. In addition it is desired that the process control continue operation at the previous setting, therefore the sample and hold circuit 46 holds the setting at the previously detected level to regulate the process control 34.

With the energization of the sample and hold circuit 48, the analog to digital converter 49 and the digital to analog converter 50 receive the signal from the analog divider 31 resulting from the light reading of the disc 35. The sample and hold circuit serves to hold that signal level and also to transmit it as a signal Y to an analog divider 51. The analog divider 51 in the example shown receives a constant voltage signal from a voltage source 52 and performs the function [K (2.5/Y)]. This function compares the signal Y to a value K which corresponds to the known signal which should be received from the head in reading the color of the disc 35. Thereafter the resulting modifying signal Z generated by the analog divider is fed through the conductor 47 to the analog multiplier 42.

The calibration control energizes the actuator 39 to move the disc 35 from beneath the light detecting head 15. At the same time the switch 44 is closed. With the subsequent reading of the color of a product passing along the conveyor 11, the resulting ratio signal is generated by the analog divider 31 in the manner previously described and transmitted through the conductors 40 to the analog multiplier 42. The sample and hold circuit, in retaining the previous signal resulting from the reading of the disc 35, transmits the signal Y to the analog divider which in turn generates the modifying signal Z received by the analog multiplier. The analog multiplier modifies the incoming ratio signal with the resulting modified signal being transmitted through the switch 44, the sample and hold circuit 46 to the readout device 32 and the process control 34.

Thus it can be seen that the calibrating sequence serves to generate a modifying signal which is retained and used for correcting all subsequent ratio signals generated by the color apparatus. Whether or not the signal received from the color apparatus is a result of a direct reading of a color or the result of the generation of a ratio as described herein, the automatic calibrator serves to adjust such signals for greater accuracy of color measurement. The modifying signal Z remains constant until the next calibration sequence is completed.

Figure 4:
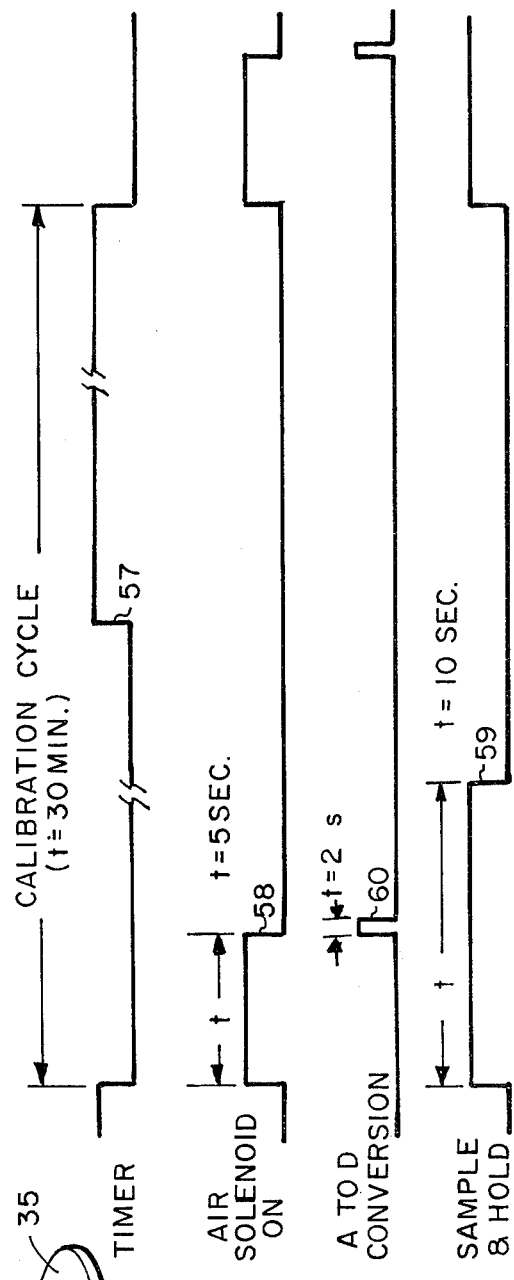
FIG. 4 shows selected waveforms for a portion of the circuit of FIG. 3.

One embodiment of the calibration control is shown in FIG. 3. As shown, the calibration sequence is initiated by a timer 54 which triggers a pair of one-shots 55 and 56. The timer signal is shown in FIG. 4 as waveform 57. In this instance the low logic signal from the timer causes the one shot 55 to transmit the signal 58 to energize the actuator 39 for a time period of five seconds. At the same time the one shot 56 is energized to activate the sample and hold circuit 46 by the waveform 59. This maintains the process control 34 at the previous setting while the switch 44 is opened.

With the calibration disc 35 moved into the viewing area beneath the housing 15, the analog to digital converter is activated by a signal 60 transmitted by the one shot 61 through the conductor 47 to perform a conversion cycle. Thus the calibration signal Z is generated in the manner previously described. Thereafter the one shot 61 times out at approximately the same time as the one shot 55 to deactivate the converter 49 and retrieve the disc 35. Also the switch 44 is closed followed by deactivation of the sample and hold by the timing out of the one shot 56.

Thus the calibration sequence is completed to be repeated again when the timer 54 again generates a low logic signal. Other methods of triggering the calibration sequence coule also be used such as a counter for detecting product quantity passing the housing 15.

The invention claimed:

1. Apparatus for continuously measuring the color of a product, comprising in combination:
   a color detecting head for detecting light reflecting from the product and for generating a color signal responsive to the color of said product;
   means to store said color signal for supplying a continuous color signal from the apparatus;
   a target of known color;
   means to detect the color of said target by said head and to generate a first color signal responsive thereto;
   means to generate a predetermined signal corresponding to the color of said target;
   means to compare the predetermined signal and the color signal responsive to the target to generate a modifier signal responsive to the difference therebetween; and
   means to modify all subsequent color signals by said modifier signal thereby to calibrate said apparatus.

2. Apparatus as defined in claim 1 wherein said color detecting head includes a light source for directing light of a preselected wavelength onto said product.

3. Apparatus as defined in claim 2 including means for moving said target between the color detecting head and the product for the generation of said modifier signal.

4. Apparatus for monitoring the color of a product, comprising in combination:
   a color detecting head for focusing light of preselected wavelengths on the product and for detecting and generating a color signal responsive to the wavelength of the reflected light;
   a readout device for indicating the color signal;
   a target of known color and means for focusing the light from the head thereon to generate a second color signal; and
   means adjusting the value of said second color signal to a predetermined value comprising:
   circuit means for receiving the second color signal resulting from the light being focused on the target;
   means to generate a predetermined signal which corresponds in value to a normal signal indicating the color of the known target;
   means to compare the second color signal to the predetermined signal to generate a modifier signal changing the second color signal to the value of the predetermined signal; and
   means to store said modifier signal and to correct all subsequent color signals with the modifier signal thereby to calibrate said apparatus.

5. Apparatus as defined in claim 4 wherein said color detecting head includes a light source for directing light of a preselected wavelength onto said product.

6. Apparatus as defined in claim 4 wherein said readout device is disabled while said second color signal is being generated; and
   means are provided to store said color signal so that a continuous color signal is supplied by said apparatus while said modifier signal is being generated.

7. The method of calibrating a color measuring apparatus having a color detecting head for generating a color signal responsive to the color of a product on which the head is focused, comprising the steps of:
   focusing the head on a target of predetermined color to generate a first color signal;
   generating a predetermined color signal responsive to the actual color of the target;
   comparing the first color signal and said predetermined color signal to generate a modifier signal; and
   modifying all subsequent color signals with said modifier signal to calibrate said color measuring apparatus.

8. The method as defined in claim 7 including the step of storing a color signal responsive to the color of said product and supplying a continuous color signal from the apparatus while the predetermined color signal is being generated and compared to the first color signal.

* * * * *